(12) United States Patent
Cobb et al.

(10) Patent No.: US 6,249,384 B1
(45) Date of Patent: *Jun. 19, 2001

(54) DETECTION AND CORRECTION OF SKEW BETWEEN A WRITING LASER BEAM AND LENTICULES IN LENTICULAR MATERIAL

(75) Inventors: Joshua M. Cobb, Victor; Robert J. Zolla; Jeffrey R. Hawver, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/342,391

(22) Filed: Jun. 29, 1999

(51) Int. Cl.[7] .............................. G02B 27/10; G03B 27/32
(52) U.S. Cl. ................................ 359/623; 355/22; 355/77
(58) Field of Search ................................ 250/548, 559.3; 355/22, 77; 356/401; 359/463, 619, 923, 624, 201, 209; 430/22

(56) References Cited

U.S. PATENT DOCUMENTS

| | | | |
|---|---|---|---|
| 5,424,553 | 6/1995 | Morton | 250/548 |
| 5,633,719 | 5/1997 | Oehlbeck et al. | 356/401 |
| 5,681,676 | 10/1997 | Telfer et al. | 430/22 |
| 5,697,006 | 12/1997 | Taguchi et al. | 396/330 |
| 5,699,190 | 12/1997 | Young et al. | 359/619 |
| 5,729,332 | 3/1998 | Fogel et al. | 355/77 |
| 6,087,054 | * 7/2000 | Cobb et al. | 430/30 |
| 6,154,247 | * 11/2000 | Marino et al. | 347/256 |

* cited by examiner

Primary Examiner—Georgia Epps
Assistant Examiner—David N. Spector
(74) Attorney, Agent, or Firm—William F. Noval

(57) ABSTRACT

A method of detecting the relative skew between a reference beam and transparent lenticular material of the type having a repeating pattern of cylindrical lenses, comprising the steps of: forming a beam of light; focusing the beam of light into a line with a width smaller than the pitch of the cylindrical lenses onto the lenticular material; moving the lenticular material relative to the beam in a direction such that the beam crosses the longitudinal axes of the cylindrical lenses to modulate the angle of reflection or refraction of the beam of light; and sensing the position of the line of modulated beam of light along a line parallel to the longitudinal axes of the cylindrical lenses to determine the skew or relative angular location of lenticular material to the focused line.

35 Claims, 8 Drawing Sheets

DETECTION AND CORRECTION OF SKEW BETWEEN A WRITING LASER BEAM AND LENTICULES IN LENTICULAR MATERIAL

FIELD OF THE INVENTION

The invention relates generally to the field of manufacturing lenticular images and more particularly to detecting and measuring the relative skew of a writing laser beam to lenticular material which is used for producing the lenticular images. More specifically, the invention relates to the detection of the skew between the writing laser beam and the lenticules as the material is transported in a scanning laser printer.

BACKGROUND OF THE INVENTION

Lenticular images include an array of cylindrical lenses (or lenticules) in a lenticular material and a sequence of spatially multiplexed images that are viewed through the lenticular material so that different ones of the multiplexed images are viewed at different angles by the viewer. One image effect produced by the lenticular image is a depth or stereoscopic image where the lenticules are oriented vertically and one eye views one image of a stereo pair or sequence from one angle and the other eye views another image from the stereo pair. Another image effect is a motion image where different images in a motion image sequence are viewed by both eyes, while changing the angle at which the image is viewed. In this image effect the lenticules are oriented in the horizontal direction and the lenticular material is rotated about the long axis of the lenticules. Other effects that combine these two effects, or form collages of unrelated images that can be viewed from different viewing angles can be provided.

It has been proposed to create stereoscopic images by providing a lenticular material having a color photographic emulsion thereon. The stereoscopic images are exposed onto the lenticular material by a laser scanner and the material is processed to produce the lenticular image product. See for example, U.S. Pat. No. 5,697,006 issued Dec. 9, 1997 to Taguchi et al.

The image that is exposed on the lenticular material must be very precisely positioned under each lenticule. If the separate image lines produced by the writing laser beam of the laser scanner and the lenticules on the material are not aligned parallel, the resulting skew misalignment will degrade the image quality. There is a need therefore for an improved manufacturing process for making lenticular image products from lenticular material of the type having a lenticular lens array coated with photographic emulsion.

The following patents disclose various arrangements for aligning a lenticular overlay with a lenticular print which do not address the problem of aligning a writing laser beam with the lenticules of a photosensitive lenticular material.

U.S. Pat. No. 5,729,332, issued Mar. 17, 1998, inventors Fogel et al.

U.S. Pat. No. 5,633,719, issued May 27, 1997, inventors Oehlbeck et al.

U.S. Pat. No. 5,699,190, issued Dec. 16, 1997, inventors Young et al.

U.S. Pat. No. 5,424,553, issued Jun. 13, 1995, inventor Morton.

It is known to scan a non actinic laser beam across a lenticular array in a direction perpendicular to the axes of the lenticules, and to sense the deflection of the beam by the lenticules to produce an output clock for modulating a writing laser beam. See U.S. Pat. No. 5,681,676, issued Oct. 28, 1997 to Telfer et al.

It is one object of this invention to provide a method and apparatus for detecting and/or measuring lenticular skew relative to the writing laser beam for the purpose of printing accurate images on the material. It is another object of the invention to provide a method and apparatus for minimizing skew during manufacture of a lenticular image product.

SUMMARY OF THE INVENTION

The present invention is directed to overcoming one or more of the problems set forth above. Briefly summarized, according to one aspect of the present invention, a lenticular image product is formed from a lenticular material having an array of cylindrical lenses and a photographic emulsion coated thereon, by scanning the lenticular material with an intensity modulated first beam of light in a direction parallel to the long axes of the cylindrical lenses to form a latent lenticular image in the photographic emulsion. A second beam of light having a wavelength outside of the range of sensitivity of the photographic emulsion is focused into a line whose width is smaller than the pitch of the cylindrical lenses onto the lenticular material. The line of the second beam of light is directed parallel and adjacent to or overlapping the first beam of light in the direction of the long axis of the cylindrical lenses of the lenticular material. The lenticular material is moved through the beam to provide a page scan motion across the short axes of the lenticules of the material and to modulate the angle of reflection or refraction of the second beam of light caused by the lenticules. The position of the angularly modulated second beam of light is sensed along a line parallel to the longitudinal axis of a lenticule and the sensed position is used to control the rotational position of a pivoting cylinder mirror assembly or the rotational position of a platen supporting the lenticular material. As a result, the skew between the writing laser beam and the longitudinal axis of the cylindrical lens is minimized and the parallel alignment of the writing laser beam to the lenticule is maintained.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The invention provides an accurate method and apparatus for either mapping lenticular skew or detecting skew which can be compensated in a laser printer, thereby enabling efficient production of high quality lenticular image products using lenticular material having photographic emulsion coated thereon. The invention is cost effective and automated.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1B:
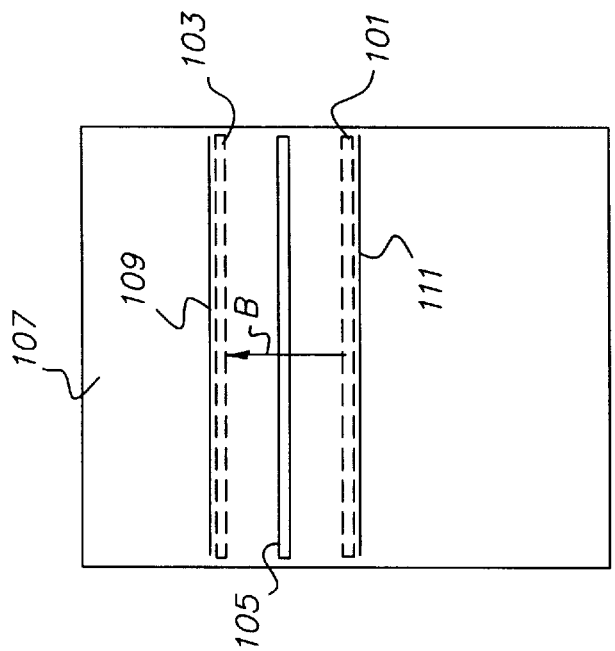
FIGS. 1A–4F are diagrammatic views useful in explaining the present invention.
Figure 1A:
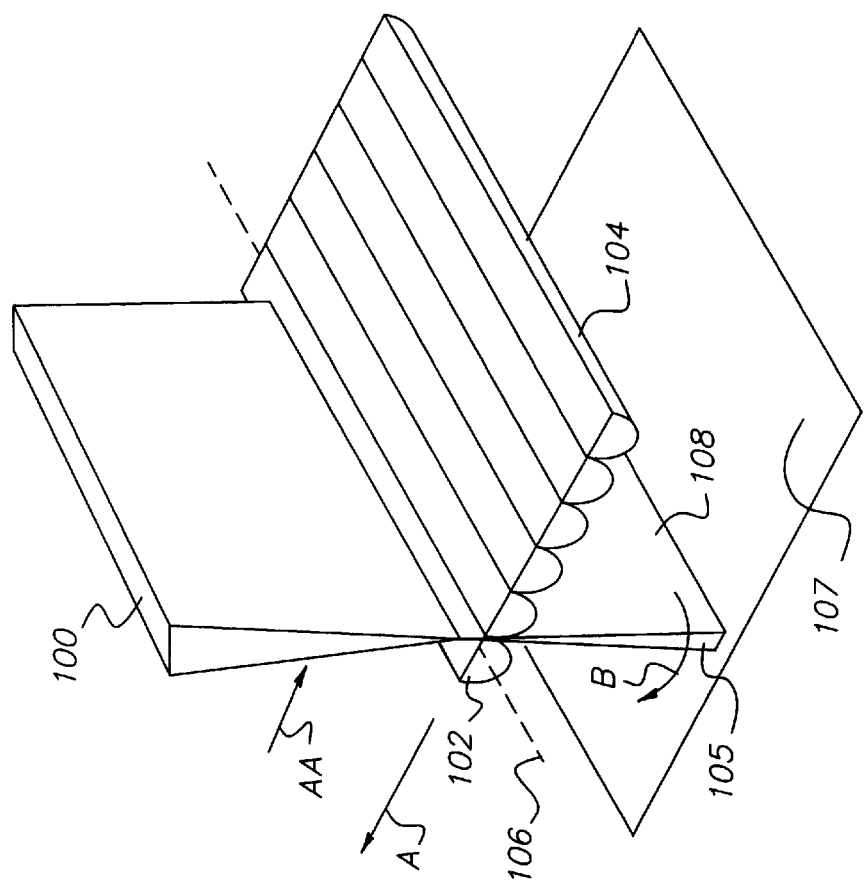

FIG. 1A illustrates a line of light 100 as it passes through a lenticule 102 of transparent lenticular material 104. Lenticules 102 form cylindrical lenses. As shown, the line of light 100 is parallel to the longitudinal axis 106 of lenticule 102. The light that is transmitted through lenticule 102 forms a line of light 108 which is also parallel to longitudinal axis 106 of lenticule 102. This line of light 108, falls on surface 107 to form an imaged line 105. As the lenticular material 104 is moved in the direction of arrow A, the incident line of light 100 falls on different positions of lenticule 102, and the transmitted line of light 108 is refracted to different positions on surface 107, but remains parallel to axis 106. The resulting refraction of line of light 108 as the lenticular material 104 is moved in the direction A, causes the position of imaged line 105 to move in the direction B across surface 107. This same effect will be produced if the incident line of light 100 is translated as shown in FIG. 1A in the direction of arrow AA and the lenticular material 104 is held stationary.

FIG. 1B shows a top view of surface 107 and the imaged line 105 of line of light 108 on surface 107. In order to clearly show the imaged line 105, the lenticular material 104 has been left out. FIG. 1B further illustrates how the imaged line 105 of the refracted line of light 108 moves along surface 107 as the lenticular material 104 is moved in direction A. In accordance with the position of the incident line of light 100 on the lenticule 102, the resulting refraction of line of light 108 causes imaged line 105 to sweep from imaged line position 101 to imaged line position 103 on surface 107 in the direction of arrow B. The motion of imaged line 105 has a fixed extent and is shown by upper limit 109 and lower limit 111. The motion of imaged line 105 will not go beyond this extent because at these limits the incident line of light 100 has moved off one lenticule and onto to the next adjacent lenticule. As other lenticules of lenticular material 100 move under incident line of light 100, the imaged line 105 will jump back to imaged line position 101 and the sweeping motion of imaged line 105 will repeat.

Figure 2B:
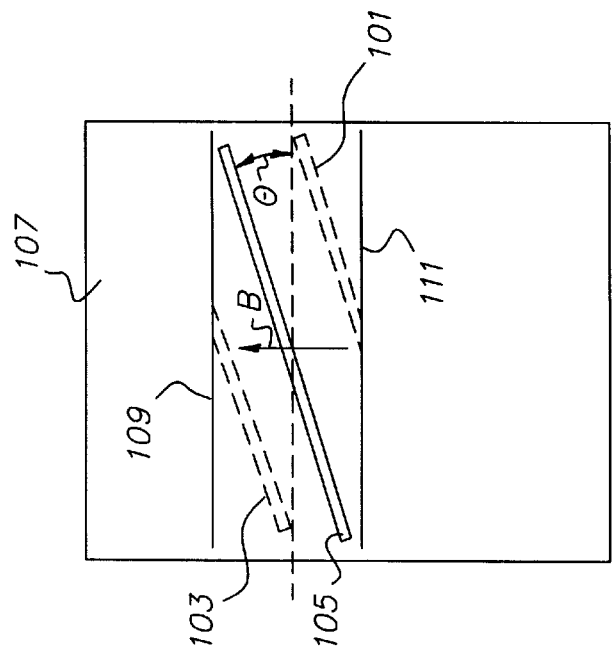
Figure 2A:
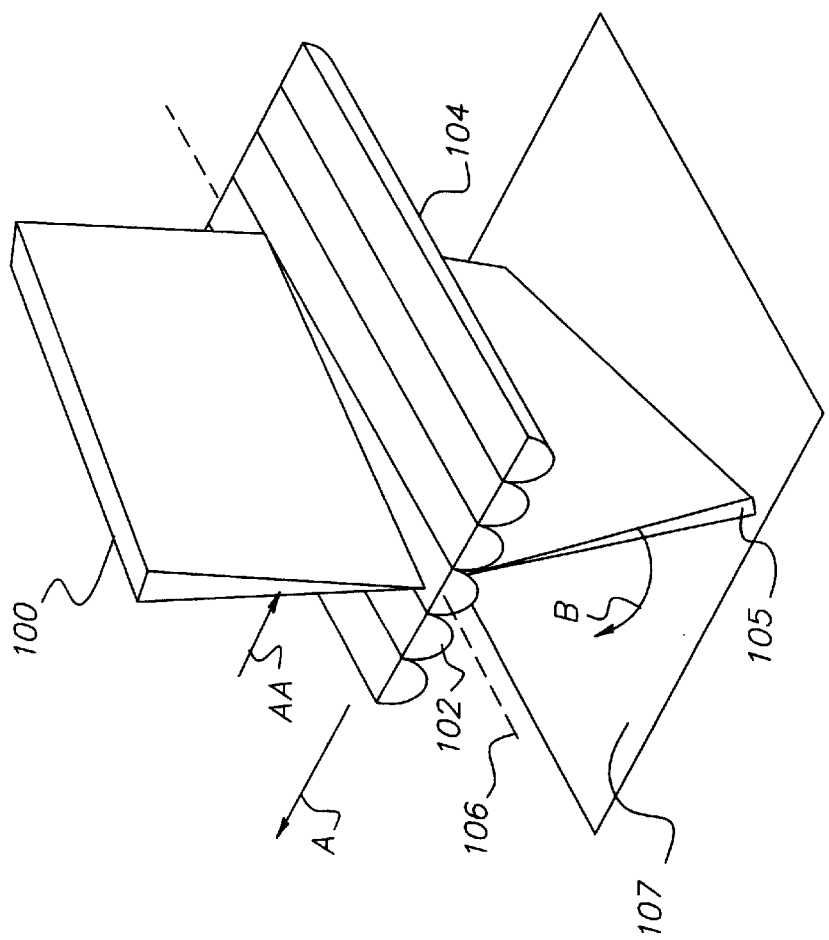

FIG. 2A shows what happens to the transmitted line of light 108 when the incident line of light 100 is slightly skewed (i.e., skewed within one lenticule) with respect to longitudinal axis 106. The transmitted and refracted line of light 108 will again produce imaged line 105, but this time imaged line 105 will be at an angle with respect to longitudinal axis 106. As either the lenticular material 104 is moved in direction A or the incident line of light 100 is translated in direction AA while lenticular material 104 is held stationary, the incident line of light 100 falls on different positions of the lenticule 102. The resulting refraction of transmitted line of light 108 produces imaged line 105 on surface 107 which is skewed relative to longitudinal axis 106 and which moves in the direction of arrow B.

FIG. 2B further illustrates the movement of imaged line 105 on surface 107 when incident line 100 is skewed relative to longitudinal axis 106. Similar to FIG. 1B, surface 107 is shown from the top with lenticular material 104 removed. Imaged line 105 is shown on surface 107 with skew angle $\Theta$ relative to longitudinal axis 106 produced by the relative skew between incident line of light 100 and longitudinal axis 106. As lenticular material 100 is moved in direction A, skewed imaged line 105 will sweep in direction B starting from imaged line position 101 to imaged line position 103 on surface 107. Skew angle $\Theta$ of imaged line 105 will remain constant as imaged line 105 moves in direction B. As portions of imaged line 105 move to upper and lower limits 109 and 111, imaged line 105 will be truncated due to the fact that the incident line of light 100 has moved off of the lenticule and on to the next adjacent lenticule of lenticular material 104. Further, when imaged line 105 is at imaged line position 103 a new imaged line has already formed back at imaged line position 101. This new imaged line is produced by the fact that the incident line 100 is beginning to cross into the next adjacent lenticule of lenticular material 104. As other lenticules of lenticular material 104 move under incident line of light 100, the imaged line 105 will form back at imaged line position 101 and the sweeping motion of imaged line 105 will repeat.

Figure 3B:
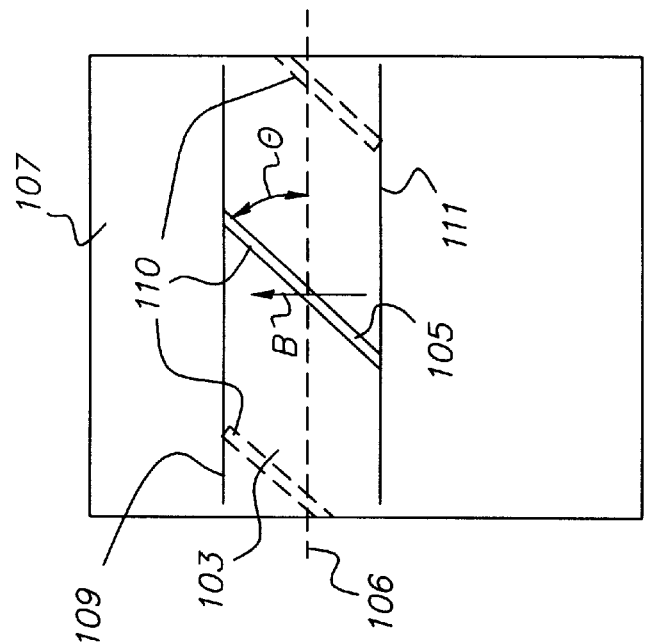
Figure 3A:
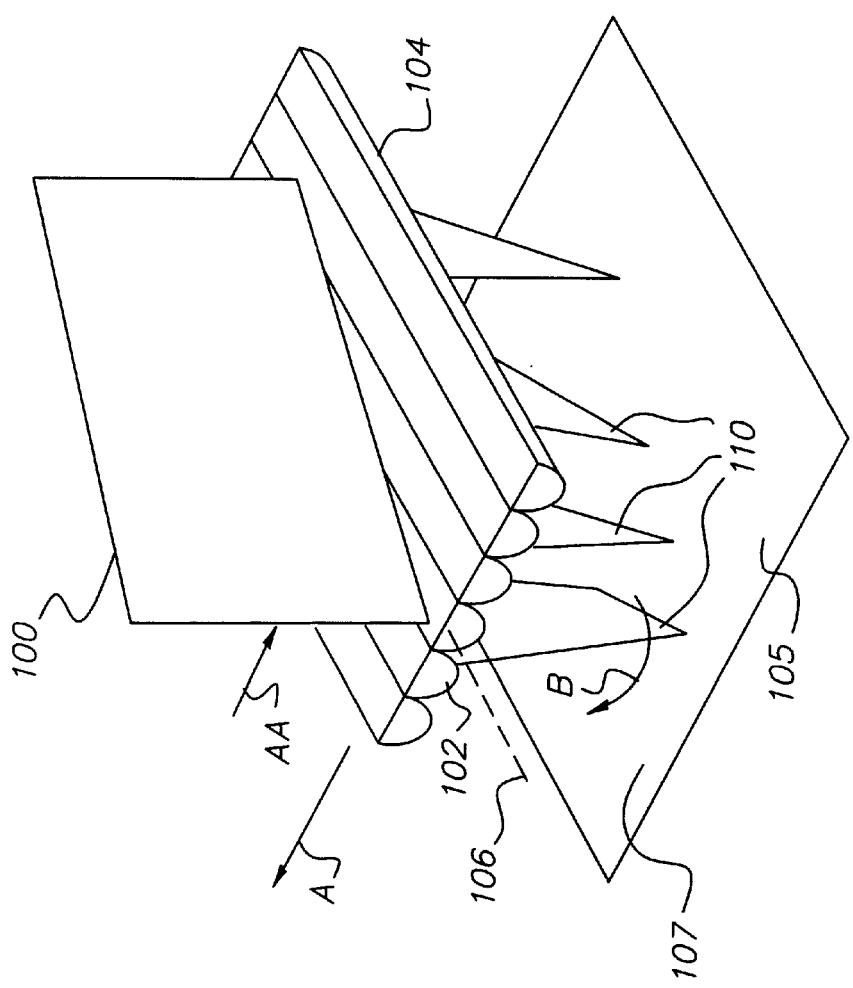

FIG. 3A shows an incident line of light 100 that is so skewed that it crosses several lenticules 102. The light transmitted through lenticules 102 forms several discontinuous imaged line segments 110 which are imaged onto surface 107, none of which are parallel to lenticule axis 106. Each imaged line segment 110 starts when the incident line of light 100 crosses over to another lenticule 102. As the incident line of light 100 falls on different positions of the lenticular media 104 as it is moved in a direction perpendicular to the axis 106, it continues to cross over multiple lenticules 102 producing transmitted light formed of angled, discontinuous imaged line segments.

FIG. 3B shows a top view of the discontinuous imaged line segments 110 on surface 107 similar to FIG. 1B and FIG. 2B where lenticular material 104 has been omitted. Imaged line segments 110 are formed on surface 107 with severe skew angle $\Theta$ relative to longitudinal axis 106. Multiple imaged line segments are formed simultaneously onto surface 107 because incident light 100 falls across multiple lenticules. As lenticular material 104 is moved in direction A of FIG. 3A, discontinuous imaged line segments 110 will move in the direction B. Skew angle $\Theta$ of imaged line segments 110 will remain constant as imaged line segments 110 move in direction B. As portions of imaged line segments 110 move to upper and lower limits 109 and 111, imaged line segments 110 will be truncated due to the fact that the incident line of light 100 has moved off of the lenticule and on to the next adjacent lenticule of lenticular material 104. This same effect will be produced if the incident line of light 100 is translated as shown in FIG. 1A in the direction of arrow AA and the lenticular material 104 is held stationary.

Figure 4A:
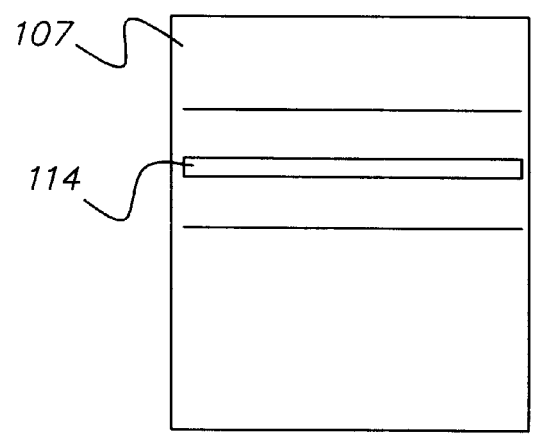

According to the present invention, the line of light transmitted through a transparent lenticular media is detected by a linear light detector placed beyond the lenticular media to detect the transmitted light. FIG. 4A shows a linear light detector 114 placed onto surface 107 where the transmitted lines of light form imaged lines. As shown, the linear light detector 114 is dimensioned to extend the length of a lenticule, although this is not a requirement to detect skew between an incident line of light and the lenticules on the lenticular material. The longitudinal axis of the linear light detector 114 is placed parallel to an incident line of light which is a reference.

Figure 4B:
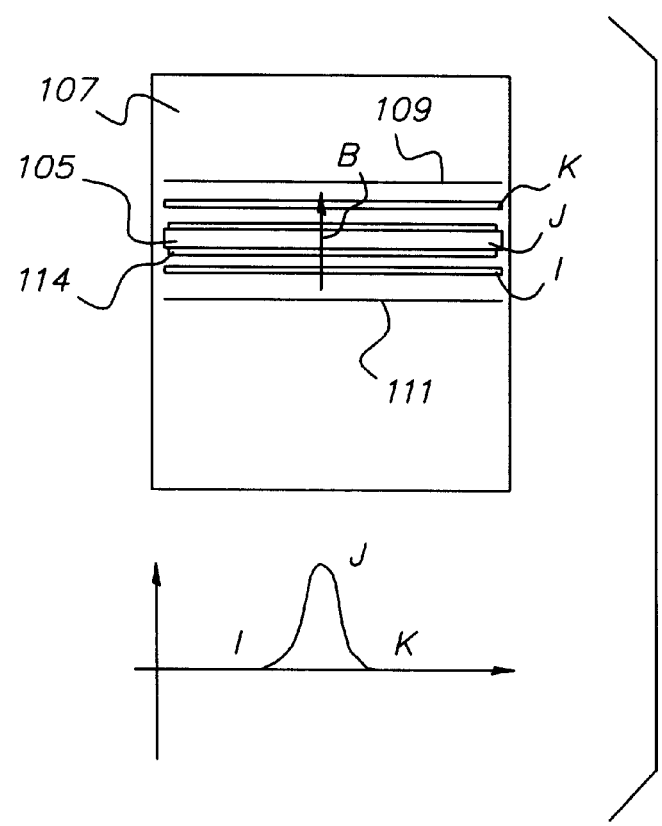

FIG. 4B shows the linear light detector 114 on surface 107 while refracted and transmitted lines are imaged both on surface 107 and linear light detector 114. In this figure the imaged lines 105 have no skew because the incident line of light is aligned parallel to the lenticules of the lenticular material. While the linear detector stays in a fixed position on surface 107, either the reference incident line of light is moved relative to the lenticular material or the lenticular material is moved relative to the reference incident line of light in a direction perpendicular to the long axis of the lenticules. The movement of the lenticular material or incident line of light in a direction perpendicular to the long axis of the lenticules causes the imaged line 105 to sweep across the linear light detector 114. The location of the imaged line 105 is shown at three positions, I, J and K as the imaged line 105 sweeps. At imaged line positions I and K the imaged line 105 does not fall on the linear light detector 114 and hence no signal is generated. At imaged line position J the imaged line 105 falls completely on the linear light detector 114 and a signal is generated. The output signal of linear light detector 114 is shown at the bottom of FIG. 4B with the positions I, J and K that correspond to that part of the generated signal. Because the imaged line 105 is parallel to longitudinal axis 106 at imaged line position J, the imaged line falls completely on the linear light detector 114 and the signal amplitude is high and the width of the amplitude is narrow as the imaged line 105 sweeps. Therefore, a generated signal from linear light detector 114 that has a high amplitude and narrow width is an indication of an imaged line 105 that is parallel to linear light detector 114 and therefore that the incident line of light is parallel to the long axis of the lenticules.

Figure 4C:
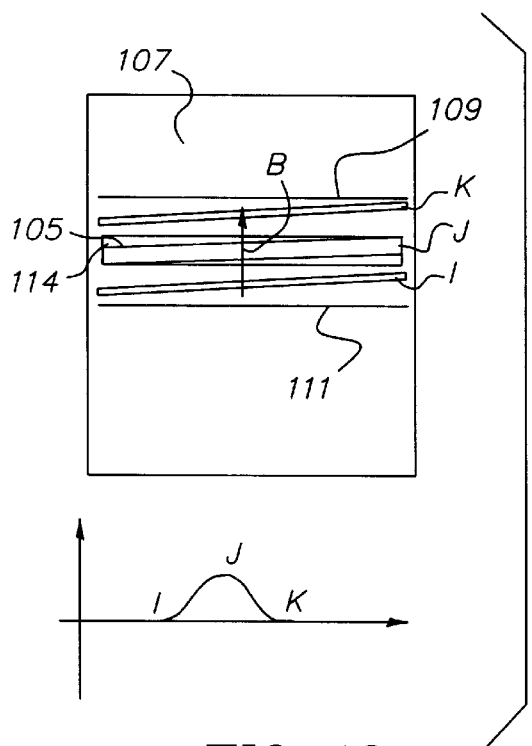
Figure 4D:
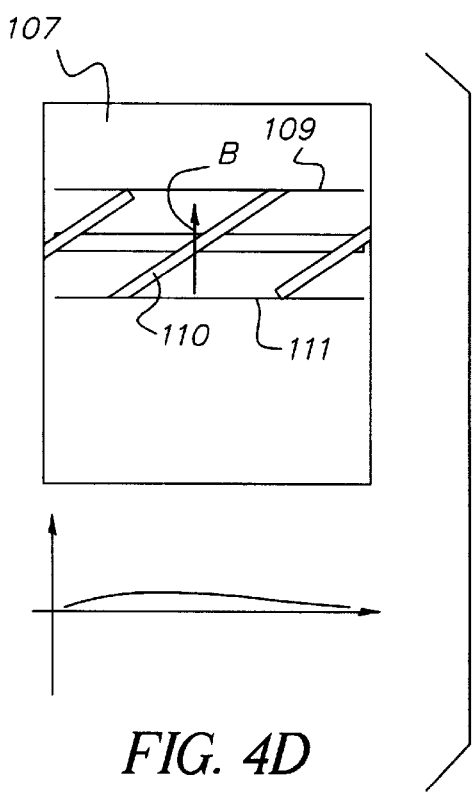

FIGS. 4C and 4D further illustrate this principal where the incident line of light is skewed relative to the long axis of the lenticules and the resulting imaged lines 105 are therefore skewed relative to the linear light detector 114. In FIG. 4C, the skew between the imaged line of light 105 and linear light detector 114 at the imaged line positions I, J and K is shown with the generated signal from linear light detector 114. At imaged line position J, the imaged line 105 no longer completely overlaps the area of the linear light detector 114 and therefore the amplitude of the signal is reduced from the one generated in FIG. 4B. The width of the generated signal from linear light detector 114 is also greater than the signal of FIG. 4B because imaged line 105 will fall on linear light detector 114 for a greater portion of the sweep that occurs as either the lenticular material or the incident line of light is moved perpendicular to the long axis of the lenticules. FIG. 4D shows the effect of extreme skew when the incident line of light crosses several lenticules at one time. The resulting skew of imaged lines 105 is so great that imaged lines 105 will always cross linear light detector 114. Due to the extreme skew angle between imaged lines 105 and linear light detector 114 the overlapped areas of imaged lines 105 on linear light detector 114 are very small resulting in a low amplitude signal as shown. Because the linear light detector 114 always has an imaged line 105 crossing as the image lines 105 sweep, the signal will have a very broad width and may be flat as shown at the bottom of FIG. 4D.

The lenticular material is then rotated while either the lenticular material or the incident line of light is moved perpendicular to the long axis of the and the linear detector signal is monitored. If the line of light is parallel to the lenticules, the transmitted light beam will walk on and off the photodetector yielding a detection signal having maximum amplitude and minimum pulse width. If the line of light is skewed with respect to the lenticules, much of the transmitted light will not hit the detector resulting in a lower amplitude signal a very wide width. By using this method the lenticular material is aligned with the incident line of light and thus the skew between the lenticules and the writing beam is minimized.

An improvement to the above method can be accomplished by replacing the linear light detector whose output is proportional to the amount of energy falling on its surface area, with a light sensor whose output is proportional to the position of the centroid of light falling on its surface. Such a sensor is commonly called either a PSD 'Position Sensing Detector' or LEP 'Lateral Effect Photodiode'. The previously described skew minimization method using the linear light detector is not able to give information as to the direction of the skew of the imaged line of light that falls on it. Therefore minimizing skew requires an integrative nulling technique where the lenticular material is arbitrarily rotated one direction to see if the detector signal amplitude becomes greater. If it does the rotation of the material is continued until a peak is found. If the first direction of rotation does not cause an increase in the amplitude, the direction of rotation must be reversed to determine if there is an increase in amplitude. This lack of directional information increases the correction time and the complexity of the control algorithm used to minimize the skew.

Figure 4F:
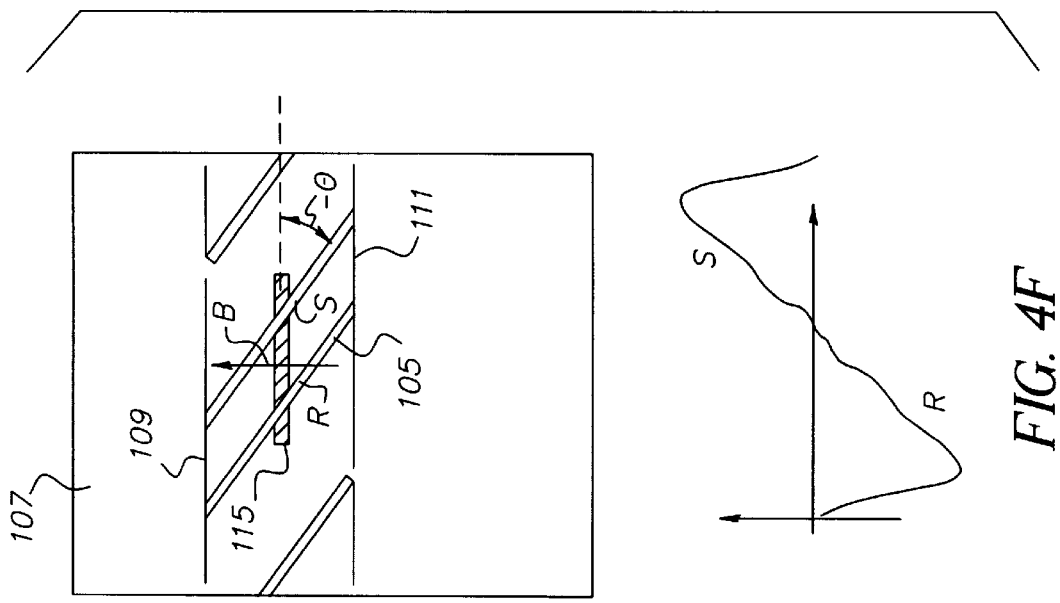
Figure 4E:
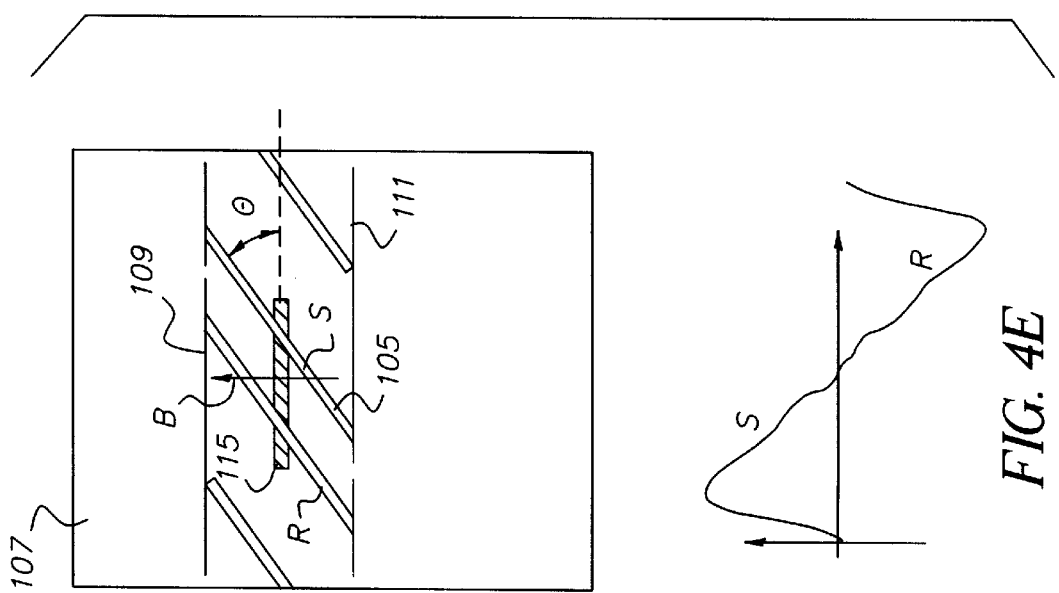

As shown in FIG. 4E the waveform produced using a PSD has direction information provided by the slope of the signal. As imaged line 105 moves across the PSD 115 the output signal is proportional to the position of the centroid of the intersection of the imaged line 105 and the detector surface. As the imaged line 105 moves in direction B, the point of intersection moves from location S to R due to the positive skew angle $\Theta$. The output signal waveform is shown below with the corresponding points R and S on the signal noted. FIG. 4F shows the skew of the lenticules opposite to that shown in FIG. 4E where the skew angle $\Theta$ is now negative. As the imaged line 105 moves in the direction B the intersection of the imaged line 105 and PSD sensor 115 moves from location R to S and the resulting waveform is inverted as shown at the bottom of FIG. 4F. By detecting the slope of the generated signal waveform it can be determined which way the lenticular material needs to be rotated to minimize the skew between the lenticular material and the writing beam. The degree of skew can also be determined from the magnitude of the slope of the generated signal waveform, with less skew producing greater slope. This is due to the fact that as the skew of imaged line 105 becomes less its intersection with PSD 115 will move across the sensor surface faster for the same displacement in the direction B.

It can be appreciated by anyone skilled in the art that other light detectors could be substituted in this application, including but not limited to, CCD array sensors or a line array of photo diodes to accomplish the same purpose.

Figure 5:
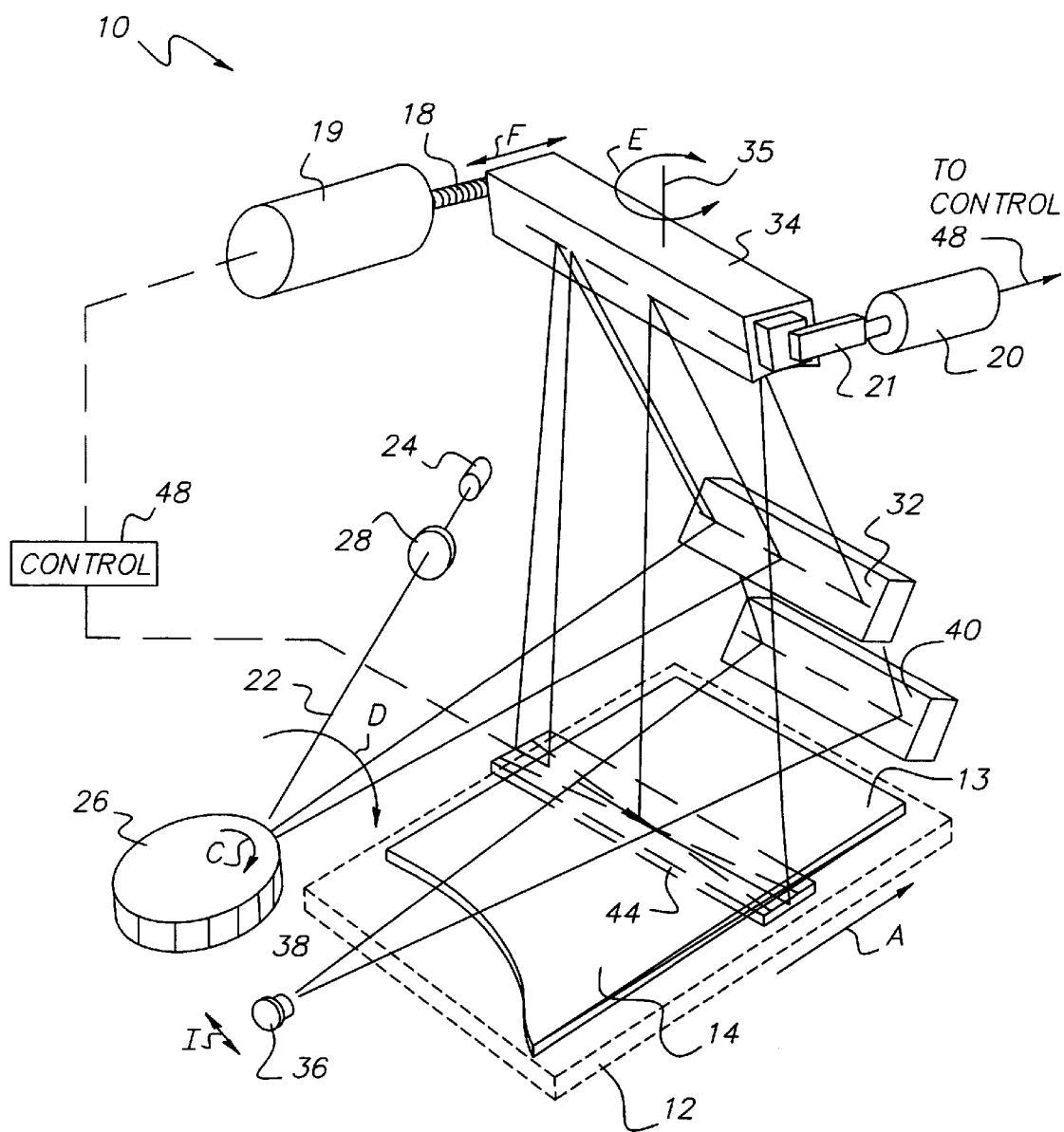
FIG. 5 is a diagrammatic view of an apparatus employed to produce lenticular image products according to the present invention.

Referring to FIG. 5, lenticular image product production apparatus 10 includes a platen 12 for supporting lenticular material 14. Lenticular material 14 is placed with the lenticules down on the top of transparent platen 12 so that the emulsion side of the lenticular material 14 faces up. A suitable mounting structure (not shown) is provided to fixedly mount linear photodetector or position sensing detector 44 under the area where lenticular material 14 is exposed, while platen 12 and lenticular material 14 are moved.

The lenticular material 14 is transported by platen 12 in the direction of arrow A by a linear transport system that is suitably driven, typically by a motor system (not shown) such as a direct drive linear motor or leadscrew. These drive systems are well understood and known in the art. The lenticular material 14 is exposed with a writing laser beam 22 from a modulated laser 24. The writing laser beam 22 is focused onto a scanning polygon 26 by optics 28. The scanning polygon 26 rotates in direction C causing the reflected writing laser beam 22 to scan in the D direction. The writing laser beam 22 is reflected from a cold mirror (reflects visible light and transmits infrared light) 32 onto pivotable cylinder mirror 34. Cylinder mirror 34 focuses the writing laser beam 22 onto the surface 13 of the lenticular material 14 thereby exposing the color photographic emulsion. (It will be understood that any type of emulsion can be used, black and white, color, monochromatic.)

An infrared laser 36, located at a distance from the surface of the material identical to the distance to the scanning face of the polygon 26, forms a second beam of light 38, of a wavelength that can be transmitted through and which does not expose the lenticular material 14. The second beam of light is reflected by mirror 40 through cold mirror 32 onto cylinder mirror 34. Cylinder mirror 34 focuses the second beam 38 onto the surface 13 of the lenticular material 14 in a line parallel to the. Linear detector or position sensing detector 44 is sensitive to the wavelength of second beam 38 and made insensitive to writing laser beam 22 by suitable filters placed over the detector during the manufacturing process. Second beam 38 passes through lenticular material 14 and is refracted by the lenticules of lenticular material 14 and impinge on fixed detector 44. Thus, the skew of second beam 38 is sensed by detector 44 relative to the lenticules of lenticular material 14.

Pivotable cylinder mirror 34 is mounted so that it is rotatable about a pivot axis 35 in the direction arrow E at the center of the scan line of writing laser beam 22. Cylinder mirror 34 rotates both the first and second laser beams 22 and 38 about pivot axis 35 and assures that the line of second beam 38 and the scan line of writing laser beam 22 are maintained parallel. The scanning polygon 26 works in conjunction with cylinder mirror 34 to cause the writing laser beam 22 to scan the lenticular material in the direction of arrow B, parallel to the longitudinal axes of the lenticules of lenticular material 14. The motion of the lenticular material 14 caused by platen 12 in the direction of arrow A provides scanning in the orthogonal or page scan direction.

Further, the angular position of pivotable mirror 34 is measured by position sensor 20 whose moving member 21 is fixedly mounted to the end portion of pivoting mirror 34. This sensor may be of any suitable type of position sensor known and employed in the art such as an LVDT, capacitive probe or potentiometer. At the other end of mirror 34 is attached a means for displacing or rotating the mirror 34. In this embodiment, a D.C. motor 19 and leadscrew 18 are employed to produced a controlled displacement of the end portion of pivotable mirror 34 in the direction of arrow F, and thus an angular displacement E about pivot axis 35. Control 48 receives signals from detector 44 and sensor 20 and sends control signals to motor 19.

It can be appreciated by those skilled in the art that any number of other suitable means may employed to produce the same displacement including but not limited to, a cam actuator, voice coil or mechanical link. Thus, by the above described means, mirror 34 can be accurately controlled to change the angle of writing laser beam 22 and second beam 38 with respect to the lenticules on lenticular material 14 and therefore to minimize any skew misalignment between them.

According to the present invention, diode 36 is oscillated in the vertical direction I to cause beam 38 to be translated orthogonal to the longitudinal axis of the lenticules of media 14. The mechanical actuator to move diode 36 is not shown but can be any of several typical mechanisms to accomplish this type of motion, such as cam actuator or motor driven leadscrew. Cylinder mirror 34 is rotated until beam 38 is aligned the longitudinal axes of the lenticules of media 14. This is effected when a maximum pulse amplitude and minimum pulse width is detected using a linear photodetector 44. If photodetector 44 is a position sensing device, a minimum amplitude and or maximum slope of the signal waveform is detected. Alignment of beam 38 results in proper alignment of beam 22. Alternately, diode 36 may be held fixed while platen 12 is moved in direction A to cause the media to move orthogonally through beam 38. Cylinder mirror 34 is rotated until beam 38 is aligned with the longitudinal axis of the lenticules of media 14 by detecting the signal waveform from photodetector 44 as previously described.

Figure 6:
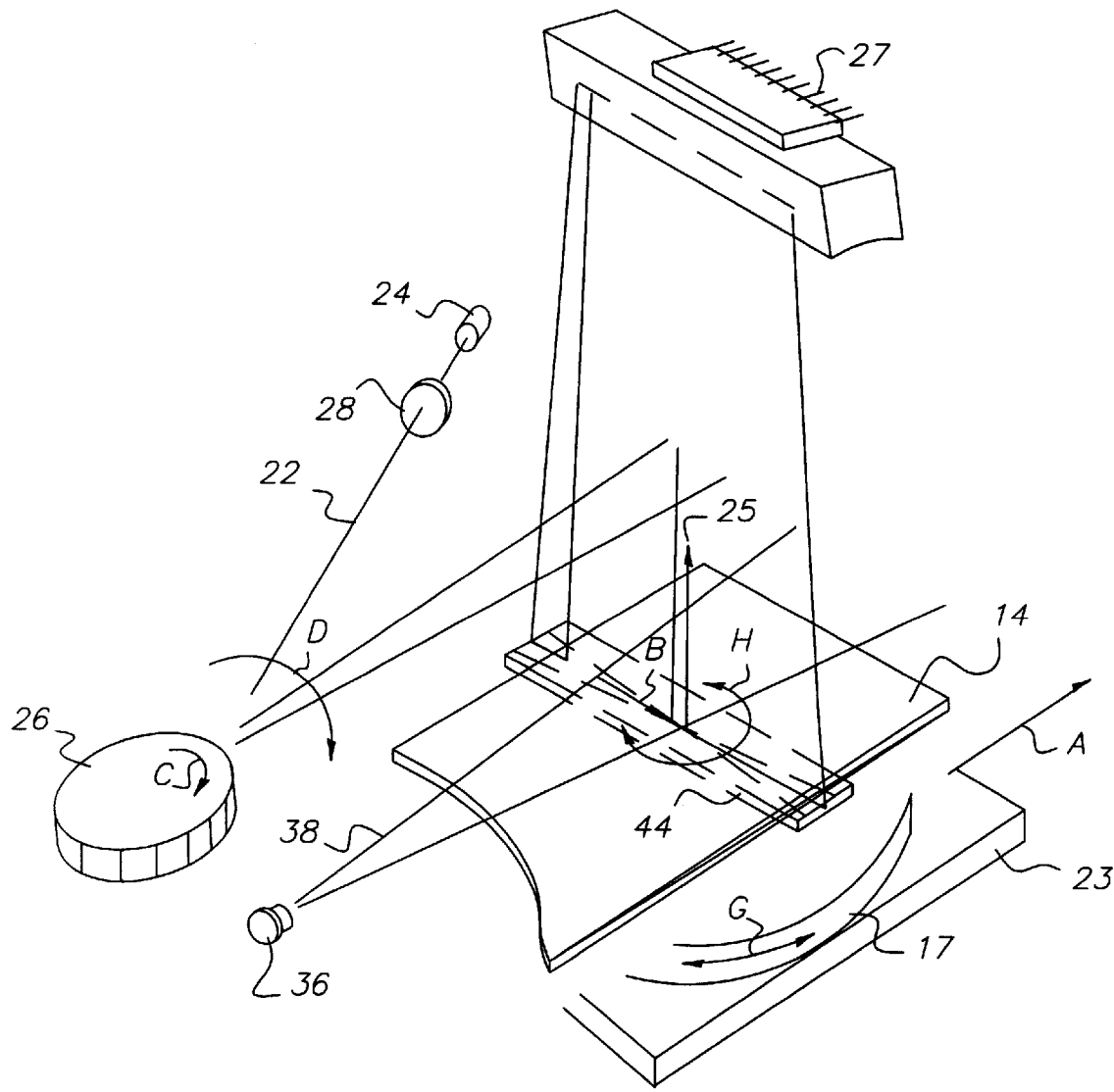
FIG. 6 is a diagrammatic view of an alternate apparatus similar to FIG. 4, employed to produce lenticular image products according to the present invention.

FIG. 6 illustrates an alternate method for aligning a writing laser beam 22 and lenticular material 14. In this alternate method the optical elements described and depicted in FIG. 5 are the same but cylinder mirror 34 is held in a fixed mount 27. Motor 19 and leadscrew 18 along with sensor 20 and its moving member 21 are not used. Movable platen 12 is mounted on a rotating mechanical stage 17 which is fixedly mounted on a stage base 23. Stage base 23 is transported in the direction A by the same type of linear transport means discussed in FIG. 5.

Rotational skew alignment of beam 38 and writing laser beam 22 to the lenticules of lenticular material 14 is accomplished by the rotational movement of mechanical stage 17 in the indicated direction G. Rotation of mechanical stage 17 in direction G produces rotational movement of platen 12 and lenticular material 14 about axis 25 of mechanical stage 17. Movement of lenticular material 14 about axis 25 changes the relative angular position of the lenticules of lenticular material 14 and writing laser beam 22 and second beam 38. The relative angular position of the lenticules of lenticular material 14 and second beam 38 is detected by fixedly mounted linear detector 44 by translating the platen and media back and forth or in one direction. Thus, the angular skew alignment of the lenticules of lenticular material 14 and writing laser beam 22 can be sensed and corrected to a minimum or any desired angular skew alignment by this means.

The means for rotational movement of mechanical stage 17 can be any of the known means used in the art, such as: motor driven worm and pinion gear, lever arm or manual adjustment.

The invention has been described with reference to a preferred embodiment; However, it will be appreciated that variations and modifications can be effected by a person of ordinary skill in the art without departing from the scope of the invention.

PARTS LIST 10 lenticular image product production apparatus
11 transparent inserts
12 platen
13 top layer of lenticular material
14 lenticular material
15 curved surface of the lenticular material
17 rotating mechanical stage
18 leadscrew
19 pivoting cylinder mirror motor
20 pivoting cylinder mirror position sensor
21 moving member
22 writing laser beam
23 rotational stage base
24 modulated laser
25 rotating mechanical stage axis
26 polygon
27 cylinder mirror fixed mount
28 optics
32 cold mirror 33 exiting beam
34 pivoting cylinder mirror
35 pivot axis
36 infrared laser
38 second beam of light
40 IR turning mirror
44 linear position detector
46 control

What is claimed is:

1. A method of detecting the relative skew between a reference beam and transparent lenticular material of the type having a repeating pattern of cylindrical lenses, comprising the steps of:
    forming a beam of light;
    focusing the beam of light into a line with a width smaller than the pitch of the cylindrical lenses onto the lenticular material;
    moving the lenticular material relative to the beam in a direction such that the beam crosses the longitudinal axes of the cylindrical lenses to modulate the angle of reflection or refraction of the beam of light; and
    sensing the position of the line of the modulated beam of light along a line parallel to the longitudinal axes of the cylindrical lenses to determine the skew or relative angular location of lenticular material to the focused line.

2. The method of claim 1, further comprising the steps of:
    directing the beam of light onto the lenticular material via a pivotable cylinder mirror;
    providing an actuator to cause the rotation of the pivoting cylinder mirror;
    providing a linear position sensor to detect the rotational position of the pivoting cylinder mirror;
    converting the sensed skew or relative angular location between the beam and the longitudinal axis of the lenticular material to a correction signal; and
    moving the pivotable cylinder mirror as a function of said correction signal to minimize the skew between the beam and the longitudinal axis of the lenticular material by moving the pivoting cylinder mirror.

3. The method of claim 1, further comprising the steps of:
    directing the beam of light onto the lenticular material via a fixed cylinder mirror;
    using a platen to move the lenticular material;
    providing an actuator to cause the rotation of the platen;
    providing a position sensor to detect the rotational position of the platen;
    converting the sensed skew or relative angular location between the beam and the longitudinal axis of the lenticular material to a correction signal; and
    moving the platen as a function of said correction signal to minimize the skew between the beam and the longitudinal axis of the lenticular material by moving the platen.

4. The method of claim 1, further comprising the steps of:
    controlling the motion of the pivoting cylinder mirror such that a the lenticular material passes through the beam with the longitudinal axis of the lenticules parallel to the beam of light.

5. The method of claim 1, wherein the lenticular material includes a photographic emulsion sensitive to a range of wavelengths and wherein the wavelength of the beam of light is outside of the range of emulsion sensitivity.

6. The method of claim 1, wherein the position of the modulated beam of light is sensed by one of a linear photosensor or a position sensing detector.

7. A method of forming a lenticular image product, comprising the steps of:
    providing a lenticular material having an array of cylindrical lenses and a photographic emulsion coated thereon;
    scanning the lenticular material with an intensity modulated first beam of light in a direction parallel to the longitudinal axes of the cylindrical lenses to form a latent lenticular image in the photographic emulsion;
    focusing a second beam of light having a wavelength outside of the range of sensitivity of the photographic emulsion into a line with a width smaller than the pitch of the cylindrical lenses onto the lenticular material;
    wherein said scanning and said focusing is effected by an optical system including a pivotable cylinder mirror;
    moving the lenticular material in a direction substantially perpendicular to the longitudinal axes of the cylindrical lenses to provide a page scan motion of the lenticular material and to modulate the angle of reflection or refraction of the second beam of light;
    sensing the position of the line of angularly modulated second beam of light to control the rotation of the pivoting cylinder mirror; and
    changing the angular position of the pivoting cylinder mirror to modify the angular relationship between the first and second beams of light and the lenticular material.

8. A method of forming a lenticular image product, comprising the steps of:
    providing a lenticular material having an array of cylindrical lenses and a photographic emulsion coated thereon;
    scanning the lenticular material with an intensity modulated first beam of light in a direction parallel to the long axes of the cylindrical lenses to form a latent lenticular image in the photographic emulsion;
    focusing a second beam of light having a wavelength outside of the range of sensitivity of the photographic emulsion into a line with a width smaller than the pitch of the cylindrical lenses onto the lenticular material;
    moving the lenticular material by means of a rotatable platen in a direction substantially perpendicular to the axes of the cylindrical lenses to provide a page scan motion of the lenticular material and to modulate the angle of reflection or refraction of the second beam of light;
    sensing the position of the line of angularly modulated second beam of light to control the rotation of the platen; and
    changing the angular position of the platen to modify the angular relationship between the first and second beams of light and the lenticular material.

9. The method of claim 7, wherein the position of the modulated beam of light is sensed by one of a linear photosensor or a position sensing detector.

10. A lenticular image product produced by the method of claim 7.

11. The method of claim 8, wherein the position of the modulated beam of light is sensed by one of a linear photosensor or a position sensing detector.

12. A lenticular image product produced by the method of claim 8.

13. Apparatus for forming a lenticular image product from a lenticular material having an array of cylindrical lenses and a photographic emulsion coated thereon, comprising:

a scanner for scanning the lenticular material with an intensity modulated first beam of light in a direction parallel to the longitudinal axes of the cylindrical lenses to form a latent lenticular image in the photographic emulsion;

a reference optical system for focusing a second beam of light having a wavelength outside of the range of sensitivity of the photographic emulsion into a line with a width smaller than the pitch of the cylindrical lenses onto the lenticular material;

wherein said scanner and said reference optical system include a common pivotable cylinder mirror;

a mechanism for moving the lenticular material in a direction substantially perpendicular to the axes of the cylindrical lenses to provide a page scan motion of the lenticular material and to modulate the angle of reflection or refraction of the second beam of light; and a linear sensor for sensing the position of the angularly modulated line of light of said second beam to control the motion of the pivoting cylinder mirror to modify the angular relationship between the first and second beams of light and the longitudinal axes of the cylindrical lenses of said lenticular material.

14. Apparatus for forming a lenticular image product from a lenticular material having an array of cylindrical lenses and a photographic emulsion coated thereon, comprising:

a scanner for scanning the lenticular material with an intensity modulated first beam of light in a direction parallel to the longitudinal axes of the cylindrical lenses to form a latent lenticular image in the photographic emulsion;

an optical system for focusing a second beam of light having a wavelength outside of the range of sensitivity of the photographic emulsion into a line with a width smaller than the pitch of the cylindrical lenses onto the lenticular material;

a mechanism for moving the lenticular material in a direction substantially perpendicular to the axes of the cylindrical lenses provide a page scan motion of the lenticular material and to modulate the angle of reflection or refraction of the second beam of light;

a linear sensor for sensing the position of the angularly modulated line of light of said second beam to control the rotation of the platen; and a device for using the angular position of the platen to modify the angular relationship between the first and second beams of light and the longitudinal axes of the lenticular lenses of said lenticular material.

15. The method of claim 14 including the step of moving said lenticular material back and forth and sensing any skew during said moving.

16. The method of claim 15 including oscillating said beam of light in order to oscillate said line of light and sensing any skew during said oscillating.

17. The method of claim 16 wherein said oscillating said beam of light is carried out by oscillating a source of said beam of light.

18. The method of claim 17 wherein said source is a laser diode.

19. The method of claim 16 wherein said oscillating said beam of light is carried out by oscillating a cylinder mirror which focuses said line of light onto said lenticular material.

20. The method of claim 1 wherein the position of said line of the modulated beam of light is sensed by a lateral effect photodiode or a linear CCD sensor.

21. The method of claim 7 wherein the sensing of the position of said line of angularly modulated second beam of light is effected by a lateral effect photodiode or a linear CCD sensor.

22. A method of detecting the relative skew between a writing beam and transparent lenticular material of the type having a repeating pattern of cylindrical lenses, the skew being such that it can be across multiple lenticules, comprising the steps of:

forming a second line of light parallel to the writing beam, the second line of light whose width is smaller than the width of the short axes of the lenticules and imaging the second line of light onto the lenticular material such that the line of light is approximately parallel to the long axes of the lenticules but may cross multiple lenticules and is transmitted through the lenticular material;

moving the lenticular material relative to the second line of light in a direction such that the second line of light crosses the long axes of the cylindrical lenses causing the refracted angle of the second line of light to be modulated in a repeating pattern as the second line of light passes through successive lenticules, the repeating pattern of the second line of light being different for different amount of relative skew between the second line of light and the lenticular material;

the change of position or velocity of the movement of the lenticular material relative to the second line of light being a known and established value;

sensing the angularly modulated position of the refracted second line of light as it passes through the lenticular media along a line nearly parallel to the lenticules of the lenticular material by a single sensor located some distance behind the lenticular material, to determine the magnitude and direction of the relative skew between the lenticular material and the second line of light.

23. The method of claim 22 further comprising the stops of:

sensing the angularly modulated position of the refracted second line of light with a single linear position sensing photodetector capable of sensing the position of the centroid of light falling on the photodetector surface and whose output signal is proportional to said position of the centroid of light on the position sensing detectors surface;

comparing the pattern of the output signal of the position sensing detector to the known positional change or velocity of the movement of the lenticular material to determine the slope and frequency of the output signal of the photodetector to measure the magnitude and direction of the relative skew between the second line of light and the lenticules of the lenticular material using the measured magnitude and direction of the relative skew between the second line of light and the lenticules of the lenticular material as a correction factor to be used to either rotate the lenticular material of the second line of light and writing beam thereby reducing the relative skew to within at least one lenticule.

24. The method of claim 22 wherein the linear position sensing photodetector used is either a lateral effect photodiode, a linear CCD array sensor, or an array of three or more linear photosensors.

25. A method of detecting the relative skew between a writing beam and transparent lenticular material of the type having a repeating pattern of cylindrical lenses, the skew being such that it can be across multiple lenticules, comprising the steps of:

forming a second line of light parallel to the writing beam, the second line of light whose width is smaller than the width of the short axes of the lenticules and imaging the second line of light onto the lenticular material such that the line of light is approximately parallel to the long axes of the lenticules but may cross multiple lenticules and is transmitted through the lenticular material;

moving the lenticular material in an oscillating back and forth fashion relative to the second line of light in a direction such that the second line of light crosses the long axes of the cylindrical lenses causing the refracted angle of the second line of light to be modulated in a repeating pattern as the second line of light passes through successive lenticules, the repeating pattern of the second line of light being different amounts of relative skew between the second line of light and the lenticular material;

the change of position or velocity of the movement of the lenticular material relative to the second line of light being a known and established value;

sensing the angularly modulated position of the refracted second line of light as it passes through the lenticular media along a line nearly parallel to the lenticules of the lenticular material by a single sensor located some distance behind the lenticular material, to determine the magnitude and direction of the relative skew between the lenticular material and the second line of light.

26. The method of claim 25 further comprising the steps of:

sensing the angularly modulated position of the refracted second line of light with a single linear photodetector whose dimensions have a large length to width aspect ratio such that the long dimension of the photodetector is parallel to the long axes of the lenticules of the lenticular media and the sort dimension of the photodetector is parallel to the short axes of the lenticular material;

Comparing the pattern of the output signal of the linear photodetector to the known positional change or velocity of the movement of the lenticular material to determine the width and peak value of the output signal of the photodetector to indicate the amount of relative skew between the second line of light and the lenticules of the lenticular material;

rotating either the lenticular material or the second line of light and the writing beam in an arbitrary direction a small angle as the lenticular material is oscillated back and forth in a direction perpendicular to the long axes of the lenticules of the lenticular material and determining if the width of the photodetector signal decreases or increases as the peak of the photodetector signal increases or decreases with respect to the known positional change or velocity of the movement of the lenticular material;

using the measured change of the width and peak value of the photodetector signal as a correction factor to be used to either rotate the lenticular material or the second line of light and writing beam in the direction that causes the photodetector signals width to decrease as the photodetectors peak increases thereby reducing the relative skew to within at least one lenticule.

27. The method of claim 26 wherein the linear photodetector is an array of two or more photodetectors whose outputs are summed together to form a single photodetector with a large length to width aspect ratio.

28. A method of detecting the relative skew between a writing beam and transparent lenticular material of the type having a repeating pattern of cylindrical lenses, the skew being such that it can be across multiple lenticules, comprising of the steps of:

forming a second line of light parallel to the writing beam, the second line of light whose width is smaller than the width of the short axes of the lenticules and imaging the second line of light onto the lenticular material such that the line of light is approximately parallel to the long axes of the lenticules but may cross multiple lenticules and is transmitted through the lenticular material;

moving the second line of light relative to the lenticular material in a direction such that the second line of light crosses the long axes of the cylindrical lenses causing the refracted angle of the second line of light to be modulated in a repeating pattern as the second line of light passes through successive lenticules, the repeating pattern of the pattern of the second line of light being different for different amounts of relative skew between the second line of light and the lenticular material;

the change of position or velocity of the movement of the second line of light relative to the lenticular material being a known and established value;

sensing the angularly modulated position of the refracted second line of light as it passes through the lenticular media along a line nearly parallel to the lenticules of the lenticular material by a single sensor located some distance behind the lenticular material, to determine the magnitude and direction of the relative skew between the lenticular material and the second line of light.

29. The method of claim 28 further comprising the steps of:

sensing the angularly modulated position of the refracted second line of light with a single linear position sensing photodetector capable of sensing the position of the centroid of light falling on the photodetector surface and whose output signal is proportional to said position of the centroid of light on the position sensing detectors surface;

comparing the pattern of the output signal of the position sensing detector to the known positional change or velocity of the movement of the second line of light to determine the slope and frequency of the output signal of the photodetector to measure the magnitude and direction of the relative skew between the second line of light and the lenticules of the lenticular material;

using the measured magnitude and direction of the relative skew between the second line of light and the lenticules of the lenticular material as a correction factor to be used to either rotate the lenticular material of the second line of light and writing beam thereby reducing the relative skew to within at least one lenticule.

30. The method of claim 29 wherein the linear position sensing photodetector used is either a lateral effect photodiode, a linear CCD array sensor or an array of three or more linear photodetectors.

31. The method of claim 28 wherein the second line of light is maintained parallel to the writing beam as it is moved relative to the lenticular material.

32. A method of detecting the relative skew between a writing beam and transparent lenticular material of the type having a repeating pattern of cylindrical lenses, the skew being such that it can be across multiple lenticules, comprising the steps of:

forming a second line of light parallel to the writing beam, the second line of light whose width is smaller than the width of the short axes of the lenticules and imaging the second line of light onto the lenticular material such that the line of light is approximately parallel to the long axes of the lenticules but may cross multiple lenticules and is transmitted through the lenticular material;

moving the second line of light in an oscillating back and forth fashion relative to the lenticular material in a direction such that the second line of light crosses the long axes of the cylindrical lenses causing the refracted angle of the second line of light to be modulated in a repeating pattern as the second line of light passes through successive lenticules, the repeating pattern of the second line of light being different for different amounts of relative skew between the second line of light and the lenticular material;

the change of position or velocity of the movement of the second line of light relative to the lenticular material being a known and established value;

sensing the angularly modulated position of the refracted second line of light as it passes through the lenticular media along a line nearly parallel to the lenticules of the lenticular material be a single sensor located some distance behind the lenticular material, to determine the magnitude and direction of the relative skew between the lenticular material and the second line of light.

33. The method of claim 32 further comprising the steps of:

sensing the angularly modulated position of the refracted second line of light with a single linear photodetector whose dimensions have a large length to width aspect ratio such that the long dimension of the photodetector is parallel to the long axes of the lenticules of the lenticular media and the short dimension of the photodetector is parallel to the short axes of the lenticular material;

comparing the pattern of the output signal of the linear photodetector to the known positional change or velocity of the movement of the lenticular material to determine the width and peak value of the output signal of the photodetector to indicate the amount of relative skew between the second line of light and the lenticules of the lenticular material, rotating either the lenticular material or the second line of light and the writing beam in an arbitrary direction a small angle as the lenticular material is oscillated back and forth in a direction perpendicular to the long axes of the lenticules of the lenticular material and determining if the width of the photodetector signal decreases or increases as the peak of the photodetector signal increases or decreases with respect to the known positional change or velocity of the movement of the lenticular material;

using the measured change of the width and peak value of the photodetector signal as a correction factor to be used to either rotate the lenticular material or the second line of light and writing beam in the direction that causes the photodetector signals width to the decrease as the photodetectors peak increases thereby reducing the relative skew to within at least one lenticule.

34. The method of claim 33 wherein the linear photodetector is an array of photodetectors whose outputs are summed together to form a single photodetector with a large length to width aspect ratio.

35. The method of claim 34 wherein the second line of light is maintained parallel to the writing beam as it is moved relative to the lenticular material.

* * * * *